March 15, 1960 A. N. GRAY 2,928,130
METHODS FOR MAKING CELLULAR PLASTIC PRODUCTS
Filed Sept. 8, 1955 3 Sheets-Sheet 1
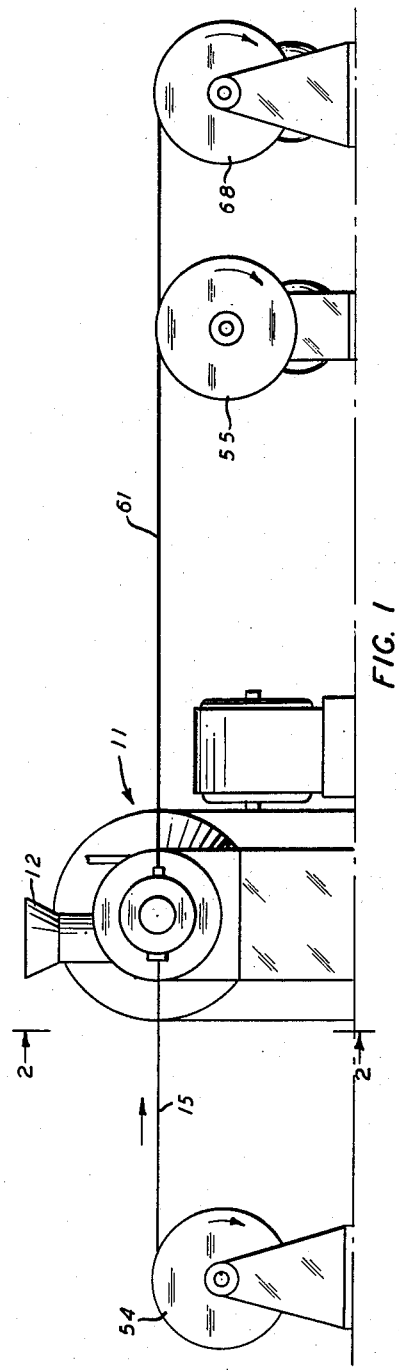
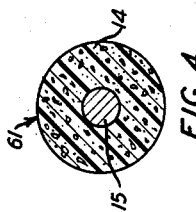
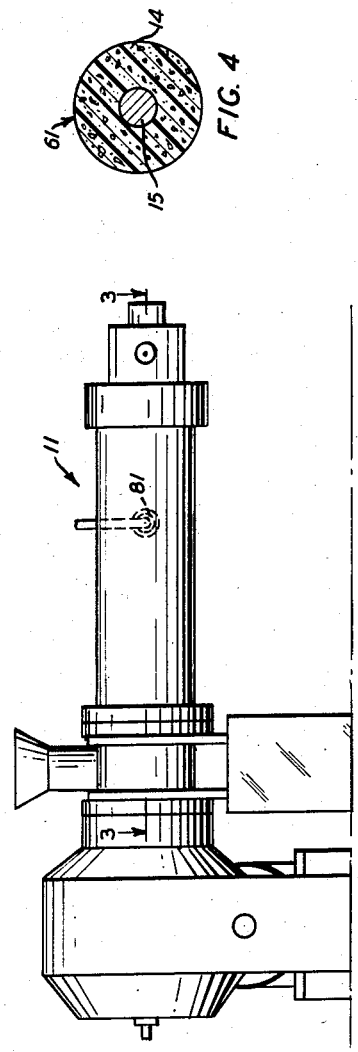
INVENTOR.
A. N. GRAY
BY
ATTORNEY March 15, 1960  A. N. GRAY  2,928,130
METHODS FOR MAKING CELLULAR PLASTIC PRODUCTS
Filed Sept. 8, 1955  3 Sheets-Sheet 2
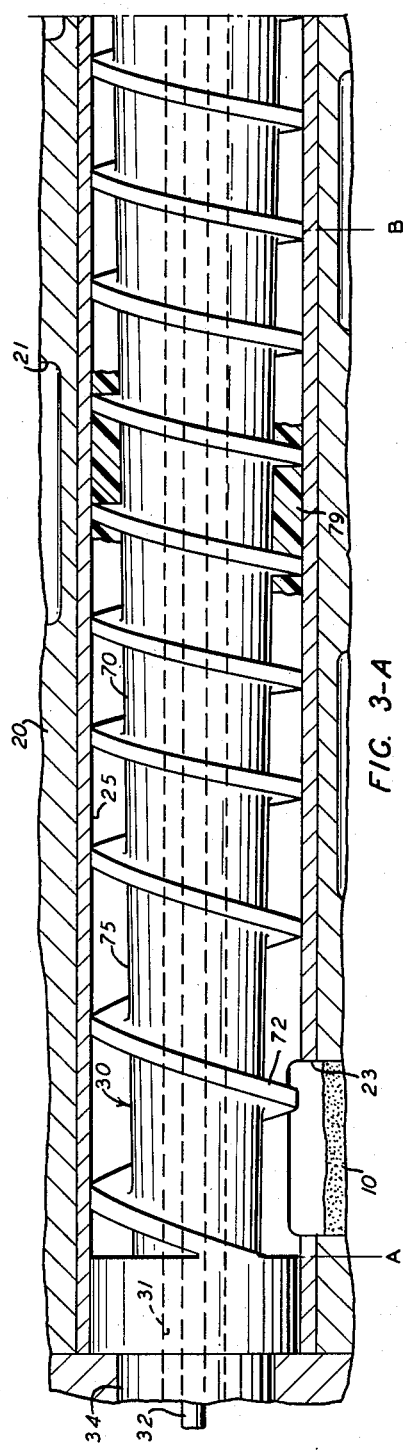
FIG. 3-A
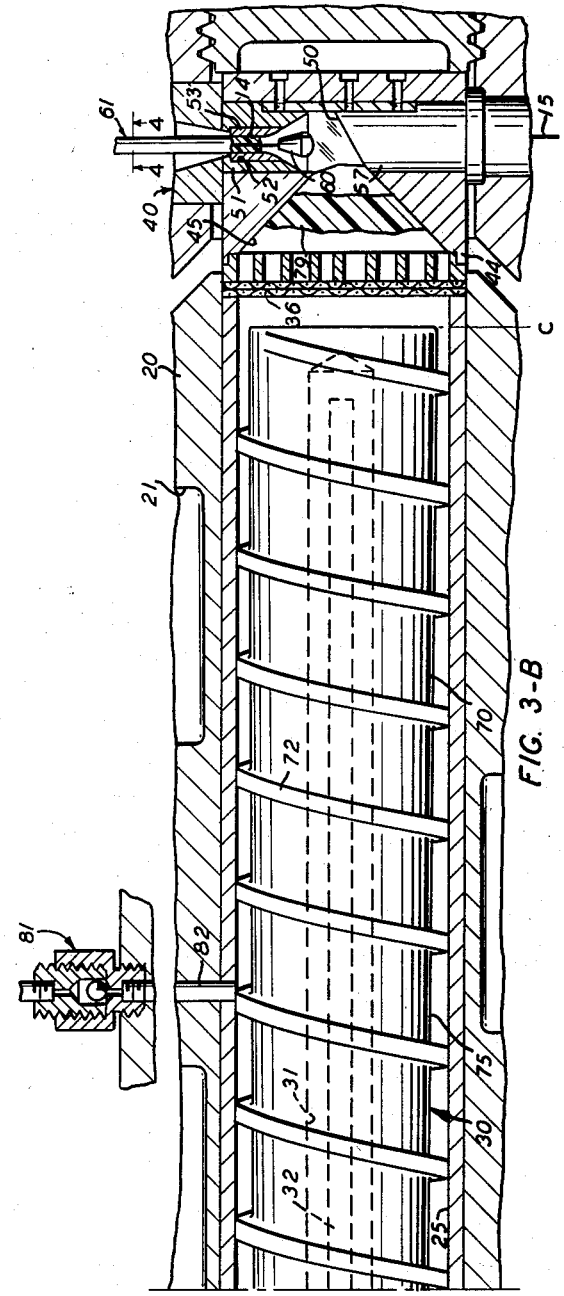
FIG. 3-B
INVENTOR.
A. N. GRAY
BY *[signature]*
ATTORNEY

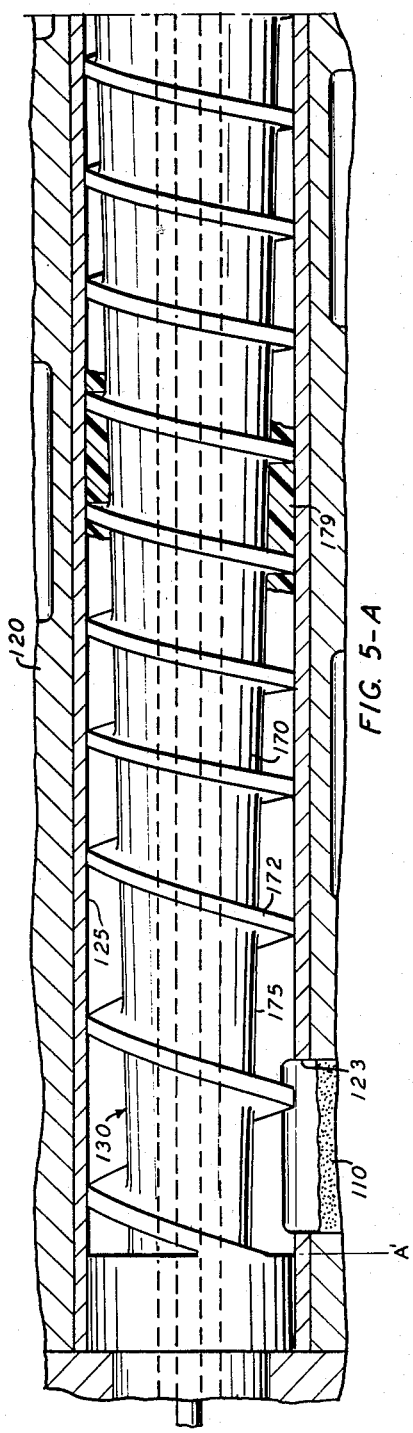
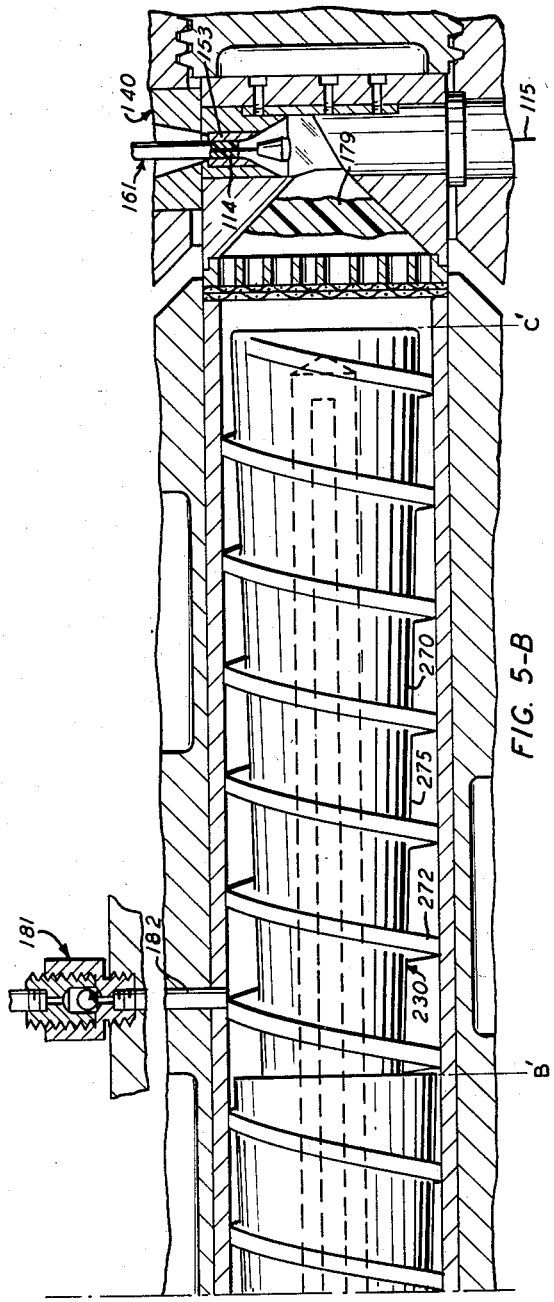

United States Patent Office 2,928,130
Patented Mar. 15, 1960

2,928,130

METHODS FOR MAKING CELLULAR PLASTIC PRODUCTS

Alvin N. Gray, Edgewood, Md., assignor to Western Electric Company, Incorporated, New York, N.Y., a corporation of New York Application September 8, 1955, Serial No. 533,206

2 Claims. (Cl. 18—48)

This invention relates to methods of making cellular plastic products, and more particularly to methods of simultaneously advancing plastic material, admixing a normally gaseous, expanding medium with the material, and extruding the resulting mixture into an article having a cellular structure.

Heretofore, in the manufacture of insulated conductors, plastic materials, such as polyvinyl halide compounds, nylon, polyethylene, or the like, have been extruded as solid coverings upon continuous conductors of indefinite length. For some purposes, it is desirable to manufacture insulated conductors having insulating coverings which include or consist of organic plastic materials in a cellular state. Conductors insulated in this manner are extremely useful for communication purposes, and are especially useful as components of telephone cables, video cables, and the like.

Polyethylene in particular possesses excellent electrical properties, having a relatively low dielectric constant, low power factor and a very high dielectric strength. It is also impermeable to water and water vapor. The electrical characteristics of multiconductor cables, such as telephone cables, made of conductors insulated with solid polyethylene are superior to those of cables employing paper insulated conductors. However, for given transmission characteristics, the former are more costly to make than the latter because polyethylene is more costly than paper. Also cables employing solid polyethylene insulation must be larger than paper insulated cables for the same voice frequency attenuations because solid polyethylene has a higher dielectric constant than does paper insulation.

Nevertheless, by using cellular polyethylene as insulation for the cable conductors, it is possible to obtain the necessary transmission characteristics and dielectric strength in a cable without substantially diminishing the benefits which accrue from the use of polyethylene as insulation. By using cellular polyethylene as the insulating material for the conductors of a cable, the cable can be made smaller for the same attenuation than a cable in which paper insulation is employed because the cellular polyethylene has a very low dielectric constant. Additional savings accrue because the presence of relatively large amounts of occluded gas in the cellular polyethylene insulation (e.g. 35% to 55% gas) minimizes the amount of polyethylene required. In consequence, the cost of cellular polyethylene insulation is competitive with that of paper insulation.

It has been suggested heretofore to introduce a gaseous material into a plastic, such as polystyrene, and to extrude the resulting mixture in a cellular state in the form of thick logs, or similar shapes. However, the methods and apparatus heretofore known for extruding organic plastic materials in such shapes are not satisfactory for extruding such materials upon conductors in the form of insulating coverings having cellular structures because the dimensions of the extruded products heretofore made and the uniformity, size and discreteness of the cells found in such products have not been critical factors. It is essential that insulating coverings for electrical conductors made of cellular plastics be of uniform diameter, be concentric with the conductors covered thereby, and have a multitude of small, discrete cells distributed uniformly throughout the bodies of plastic materials forming the coverings.

An object of the invention is to provide new and improved methods of making cellular plastic products.

A further object of the invention is to provide new and improved methods of simultaneously advancing and working organic plastic material, admixing a normally gaseous, expanding medium therewith and extruding the resulting mixture into an article having a cellular structure.

Still another object of the invention is to provide new and improved methods of forming insulating coverings of cellular plastic materials upon electrical conductors.

A method illustrating certain features of the invention may include the steps of advancing polyethylene through an extrusion apparatus by the action of a rotating extrusion screw wherein the pressure to which the polyethylene is subjected first increases progressively, then decreases abruptly, and finally increases again progressively toward the discharge end of the extrusion apparatus. An elemental gas, such as nitrogen, argon, neon or helium, is forced into the polyethylene stream in the extrusion apparatus at the point where the pressure thereon decreases abruptly, whereby the gas is thoroughly admixed with the polyethylene during the final increase of pressure and expands the polyethylene into cellular form on discharge from the extrusion apparatus.

A complete understanding of the invention may be obtained from the following detailed description of methods and apparatus forming specific embodiments thereof, when read in conjunction with the appended drawings, in which:

Fig. 1 is a side elevation of an apparatus forming one embodiment of the invention, and by means of which cellular plastic products may be made;

Fig. 2 is an elevation of an extruder forming part of the apparatus shown in Fig. 1, as viewed along the line 2—2 of Fig. 1;

Figs. 3A and 3B combined constitute an enlarged, fragmentary, horizontal section taken along line 3—3 of Fig. 2;

Fig. 4 is an enlarged, transverse section taken on line 4—4 of Fig. 3B, and showing in cross section a conductor insulated with a cellular plastic, such as is produced by means of methods and apparatus embodying the invention, and Figs. 5A and 5B are similar to Figs. 3A and 3B, and combined constitute an enlarged, fragmentary, vertical section of an apparatus forming another embodiment of the invention.

Referring now in detail to the drawings, polyethylene, or other suitable plastic compound 10, is fed into the entrance end of an extruder, indicated generally at 11 (Fig. 1), from a feed hopper 12. The plastic compound 10 may be initially in the form of granules, pellets or the like, a supply of which is maintained within the feed hopper 12. The extrusion apparatus is designed to form an insulating covering 14 (Fig. 4) of the plastic compound around a filamentary metallic conductor 15, which may be initially bare or may have a textile, or other covering thereon.

The extruder 11 includes a jacketed extrusion cylinder 20 (Figs. 3A and 3B) provided with a helical passage 21 therein through which a suitable heat exchange medium may be circulated during an extrusion operation for the purpose of controlling the temperature of the plastic compound. The extrusion cylinder 20 has a charging opening 23 at the entrance end thereof, which connects the feed hopper 12 with a longitudinally extending cylindrical extrusion bore 25 formed in the cylinder. The bore 25 is smooth walled and has a uniform diameter along its entire length.

Rotatably mounted within the bore 25 is a stock screw 30, having a central bore 31 therein which is open at the entrance end of the stock screw and closed at the discharge end thereof. Positioned within the bore 31 is a longitudinally extending pipe 32 for circulating a suitable heat exchange medium within the bore for the purpose of controlling the temperature of the stock screw 30.

The stock screw 30 (Figs. 3A and 3B) is rotated by a conventional extruder drive including a shaft (not shown), which is keyed to a short shank portion 34 formed integrally with the left hand end of the stock screw, as viewed in Fig. 3A. The stock screw 30 forces the plastic compound through the bore 25, a strainer 36 positioned transversely across the discharge end of the bore and into an extrusion head indicated generally at 40. The extrusion head 40 is secured detachably to the discharge end of the extrusion cylinder 20, and includes a tool holder 44 having a tapered opening 45 which forms a continuation of the extrusion bore 25. The tapered opening 45 communicates with an extrusion passage 50 formed in the tool holder 44 transversely with respect to the tapered opening. An annular die holder 51 positioned in the exit end of the passage 50 has a counterbore 52 formed therein in which an extruding die 53 is mounted.

The conductor 15 is advanced continuously from left to right, as viewed in Fig. 1, from a supply reel 54 by means of a conventional capstan 55. The conductor 15 passes through a core tube holder 57 and a core tube 60. The core tube 60 guides the conductor 15 through the axial center of the die 53, wherein the conductor is enveloped by the covering 14 of the plastic compound to form an insulated conductor 61. The finished insulated conductor 61 is taken up on a conventional takeup apparatus including a reel 68.

The stock screw 30 comprises a root 70 about which a single helical flight 72 is formed. The helical flight 72 has a constant external diameter along the entire length of the stock screw 30, which is substantially equal to the diameter of the extrusion bore 25. The helix angle of the flight 72, measured as the angle between the flight and a plane perpendicular to the longitudinal axis of the stock screw 30, is constant along the entire length of the screw.

The helical flight 72 is generally rectangular in cross section and relatively small in width in comparison to its pitch. In effect, it forms two sides of a helical channel 75, which is bounded on the bottom by the root 70 and on the top by the wall of the bore 25. The depth of the channel 75 is not constant along the length of the stock screw 30 due to a predetermined progressive variation in the diameter of the root 70.

In order to facilitate a description of the above-mentioned variations in the diameter of the root 70, the stock screw 30, excluding the shank portion 34 thereof, may be considered to be divided lengthwise into two sections, as indicated in Figs. 3A and 3B. The stock screw 30 is provided with a compacting section A—B lying at the left hand end, or feed end, thereof adjacent to the charging opening 23, and extending between points on the longitudinal axis of the stock screw designated A and B, respectively. The right hand end of the stock screw 30, as viewed in Fig. 3B, is the discharge end thereof. Between the compacting section A—B and the discharge end lies a working section B—C extending longitudinally from the point B on the longitudinal axis of the stock screw 30 to the point thereon designated C.

The compacting section A—B of the stock screw 30 is designed to pick up the granules of the plastic compound 10 supplied from the feed hopper 12 through the charging opening 23 and to simultaneously compact the granules into a plastic mass 79 and carry the plastic mass toward the right to the working section B—C of the screw. As illustrated in Figs. 3A and 3B, the root 70 along the compacting section A—B of the screw 30 is frustoconical in shape and tapers rearwardly uniformly from the point B to the point A at a relatively small angle with respect to the longitudinal axis of the screw. Along the entire length of the compacting section A—B, the root diameter remains relatively small in comparison to the root diameter at the discharge end of the stock screw 30. As a result, the depth of the helical channel 75 along the compacting section A—B is relatively large.

The compacting section A—B of the stock screw 30 is designed to function essentially as a screw conveyer which picks up solid granules of the plastic material from the charging opening 23, consolidates the granules into a compact plastic mass 79 and delivers the compacted plastic mass to the working section B—C of the screw. The design of the compacting section A—B is such that, as the plastic mass 79 approaches the working section B—C of the screw 30, it is completely compacted and is beginning to soften. By the time the plastic mass 79 has advanced through the compacting section A—B, it has become so compacted that it acts as a barrier or stopper. This barrier will prevent gaseous material from flowing along the channel 75 to the left, as seen in Fig. 3A, and from escaping through the charging opening 23 of the extrusion cylinder 20.

The depth of the channel 75 along the working section B—C of the stock screw 30 decreases from the point B to the point C. As the plastic mass 79 flows along the working section B—C, the volume of the channel 75 through which it advances is decreasing. As a result, the plastic mass 79 is worked intensely with a shearing action, and there is a constant build-up of pressure and temperature within the plastic mass. The temperature of the plastic mass 79 may be controlled, if necessary, by the circulation of suitable heat-exchange media within the passage 21 in the cylinder 20 and the pipe 32 and the bore 31 in the stock screw 30. The clearance between the discharge end of the stock screw 30 and the wall of the bore 25 at that point is very small, and by the time the plastic mass 79 has reached that point it is in the state of a viscous fluid and is under extremely high pressure. This pressure is sufficient to force the plastic through the strainer 36 into the extrusion head 40 and out of the die 53, so as to form the covering 14 on the conductor 15 advancing through the die.

In order to cause the covering 14 extruded upon the conductor 15 to be cellular, a normally gaseous, expanding medium is introduced into the extrusion cylinder 20 at a point along the working section B—C. The expanding medium is introduced at a point where it cannot pass through the barrier formed by the compacted plastic mass 79 and thus escape through the charging opening 23. The expanding medium is introduced into the extrusion cylinder 20 at a point sufficiently removed from the discharge end thereof to make certain that it will be thoroughly and uniformly mixed with the plastic mass 79 by the time the resulting mixture passes the discharge end of the stock screw 30. The expanding medium employed may be a suitable elementary gas, such as nitrogen.

Positioned intermediate the points B and C, there is provided a high pressure check valve 81 connected to a pipe 82, which extends through the wall of the extrusion cylinder 20 and communicates with the extrusion bore 25 therein. The check valve 81 is shown only schematically in the drawing. Although the particular type of check valve shown in the drawing is a simple ball type, any suitable high pressure check valve may be used. The check valve employed should be rugged enough to give satisfactory service under the high pressures to which it may be subjected, which may be as high as ten thousand pounds per square inch, or more.

The expanding medium is injected into the extrusion bore 25 through the valve 81 and the pipe 82 from a suitable high pressure source (not shown), such as a pressure cylinder of conventional design. The pressure of the expanding medium must be sufficient to overcome the pressure of the plastic mass 79 being advanced along the extrusion bore 25 at the point of entrance thereof. The check valve 81 is provided to prevent the plastic mass 79 from being forced outwardly therethrough in the event that the pressure of the expanding medium being supplied to the bore 25 falls below that of the advancing plastic mass.

Since the plastic mass 79 is being constantly worked with a kneading and shearing action as it is advanced along the working section B—C of the stock screw 30, the expanding medium introduced through the valve 81 is worked into and thoroughly intermingled with the plastic mass by the time the resulting mixture reaches the discharge end C of the stock screw 30. Since the plastic mass 79 is in a viscous liquid state as it progresses along this section, the expanding medium intermingles freely therewith so that a homogeneous mixture of the expanding medium with the plastic mass results. The normally gaseous, expanding media suitable for the purposes of this invention form homogeneous but uncombined mixtures.

The pressure within the extrusion head 40 is sufficiently high to prevent the expanding medium from expanding the plastic mass 79 until it emerges from the extrusion head in the form of a covering 14 on the conductor 15, even though the temperature of the plastic mass may be of the order of several hundred degrees F. However, as soon as the insulated conductor 61 emerges from the extruding die 53 into the atmosphere, the pressure thereon is released suddenly. As a result, the normally gaseous expanding medium, which is at a high temperature and is entrapped in the plastic under high pressure, expands instantly and converts the covering 14 into a cellular product, such as is shown in Fig. 4. As is shown in Fig. 4, the conductor 15 is covered with a concentric covering 14 consisting of a body of plastic compound filled with a multiplicity of small, discrete and uniformly distributed cells of the gaseous material. Because of the cellular state of the finished covering 14, its physical properties are very desirable, and insulated conductors, like the conductor 61, are particularly useful for numerous purposes, such as elements of communication systems.

*Alternative apparatus*

There is shown in Figs. 5A and 5B an alternative form of stock screw that may be used in apparatus of the type shown in Figs. 1 and 2 to replace the stock screw 30 shown in detail in Figs. 3A and 3B. In this embodiment of the invention, a stock screw is divided into two sections, the first of which, designated 130, extends from a point adjacent to a charging opening 123, designated A', to a point designated B'. This section A'—B' corresponds somewhat to the compacting section A—B, referred to in conjunction with the first-described embodiment of the invention. The second section of the stock screw, designated 230, extends from the point B' to the discharge end thereof, designated C'.

The section 130 of the stock screw comprises a root 170 about which a single helical flight 172 is formed. The helical flight 172 has a constant external diameter along its entire length, which is substantially equal to the internal diameter of an extrusion bore 125, so as to form a helical channel 175 bounded by the root 170 and the wall of the extrusion bore 125. The depth of the channel 175 constantly diminishes from the point A' to the point B'. The section 130 of the stock screw picks up granules 110 of plastic compound supplied to the charging opening 123 from a feed hopper like the hopper 12, and carries them to the right towards the end B' thereof.

Due to the fact that the depth of the channel 175 is constantly decreasing, the granules 110 are compacted and worked into a coherent mass by the time they reach the point B'. This coherent mass of plastic compound acts as a barrier or stopper to prevent leakage of gaseous material towards the left of the point B'. Also due to the constantly decreasing depth of the channel 175, the plastic compound is placed under increasingly high pressure, and the pressure on the compound at the point B' is such as to resist the entrance of gaseous material into the portion A'—B'.

The section 230 of the stock screw may be termed the working section. The section 230 likewise is provided with a root 270 and a single helical flight 272 having an external diameter substantially equal along its entire length to the diameter of the extrusion bore 125. This leaves a helical channel 275 bounded by the root 270 and the wall of the bore 125. Like the channel 175, the channel 275 decreases in depth constantly from the point B' to the point C'. Along the working section B'—C' the plastic compound is worked with a shearing action and the pressure thereon increases constantly from the beginning of the section B'—C' to the end thereof.

Since the diameter of the root 270 at the point just to the right of the point B' is considerably less than the diameter of the root 170 at the point B', there is a sudden change in the pressure on the plastic compound as it emerges from the channel 175 and enters the channel 275. The clearance between the root 170 and the wall of the bore 125 at the point B' is very small, while the clearance between the root 270 and the wall of the extrusion bore 125 just to the right of the point B' is quite large. Consequently, there is a sudden pressure drop in the plastic compound in the areas immediately to the right of the point B', while the pressure immediately to the left of the point B' is maintained at a high value.

A high pressure, check valve 181 is connected to a pipe 182, which extends through the wall of the extrusion cylinder 120 and communicates with the extrusion bore 125 therein just to the right of point B'. The check valve 181 may be of the same design as the check valve 81 referred to previously. A normally gaseous, expanding medium, such as nitrogen, is injected into the extrusion bore 125 through the valve 181 and the pipe 182 from a suitable high pressure source under a pressure in excess of the pressure of the plastic compound in the area where the gaseous material is introduced through the valve 181.

Since the plastic compound is being constantly worked with a kneading and shearing action as it is advanced along the working section B'—C' of the stock screw section, the expanding medium introduced through the valve 181 is worked into and thoroughly intermingled with the plastic compound by the time the resulting mixture reaches the discharge end C' on the stock screw section 230. The plastic compound is in a viscous fluid state along this section, and the expanding medium intermingles freely therewith so that a homogeneous mixture of the plastic and gaseous material results.

The intimate mixture of plastic compound and expanding medium leaving the discharge end C' of the section 230 of the stock screw is forced through an extruding head 140 of the same design as is shown in Fig. 3B and described previously in detail. A conductor 115 is advanced through the extruding head 140, and the mixture of plastic compound and expanding medium is formed into a covering 114 about the conductor 115 to form an insulated conductor 161.

The pressure within the extruding head 140 is sufficiently high to prevent the expanding medium from expanding the plastic compound until it emerges from the extrusion head in the form of a covering 114 on the conductor 115. However, as soon as the insulated conductor 161 emerges from an extruding die 153 into the atmosphere, the pressure thereon is released suddenly. As a result, the expanding medium entrapped in the plastic compound at a high temperature and under high pressure expands instantly and converts the covering 114 into a cellular product consisting of a body of plastic compound filled with a multiplicity of small, discrete and uniformly distributed cells of the expanding medium.

The advantage of this particular apparatus is that the normally gaseous, expanding medium injected into the extrusion bore 125 need not be under as high a pressure as is necessary for the embodiment shown in Figs. 3A and 3B, since the pressure on the plastic compound adjacent to the check valve 181 is much lower than that of the compound adjacent to the check valve 81. At the same time, the plastic compound to the left of the point B' is in such a compact state and is under such high pressure that no gaseous material can escape into the channel 175 from the channel 275.

While in the foregoing description polyethylene has been mentioned as the plastic material employed to produce cellular plastic products, this invention is not restricted to the use of polyethylene as the plastic material. Instead of polyethylene, plasticized polystyrene, polyvinyl halide compounds, copolymers of vinyl chloride and vinyl acetate, nylon, or other suitable thermoplastic materials may be used to form cellular plastic products, such as conductors insulated with cellular insulation.

Nitrogen has been mentioned as one form of gas that might be used to produce cellular plastic products. In place of nitrogen, other normally gaseous elements, compounds or mixtures thereof may be used as the agents to produce cellular plastic products. Among the other elemental gases that might be employed with satisfactory results are argon, neon and helium.

In addition, normally gaseous organic compounds may be used to expand the plastic material. Among the most important of these are the halogen derivatives of methane and ethane, which are used as refrigerants and for similar purposes, such as chlorodifluoromethane, dichlorodifluoromethane, dichlorofluoromethane, difluorotetrachloroethane, dichlorotetrafluoroethane, difluorochloroethane, 1,1-difluoroethane, ethyl chloride, methyl bromide, methyl chloride, and trichlorofluoromethane.

Other normally gaseous compounds that may be employed are acetylene, ammonia, butadiene, butane, butene, carbon dioxide, cyclopropane, dimethylamine, 2,2-dimethylpropane, ethane, ethylamine, ethylene, isobutane, isobutylene, methane, monomethylamine, propane, propylene, and trimethylamine.

All of the aforementioned materials are intended to be embraced within the term "normally gaseous, expanding medium," as used herein. This term is intended to mean that the expanding medium employed is a gas at the temperatures existing under the normal operating conditions of a plastics extruder. Also, when reference is made to the introduction of a normally gaseous, expanding medium or a gas into a plastic compound in an extrusion cylinder, it is to be understood that, while the material introduced is a gas at the normal operating temperature of the extruder, it may be in either the gaseous or the liquid state at the temperature and pressure at which it is introduced into the extrusion cylinder. In fact, it is advantageous to employ expanding agents which are liquids when introduced into the extrusion cylinder because it is easier to pump a liquid under constant pressure and volume than it is to supply a gas under constant pressure and volume.

While in the foregoing description, reference has been made to specific apparatus embodying by means of which methods the invention may be practiced, other forms of apparatus suitable for the purpose of the invention may be devised and utilized by persons skilled in the art without departing from the spirit and scope of the invention.

What is claimed is:

1. The method of producing cellular polyethylene articles, which comprises advancing polyethylene through an extrusion apparatus by the action of a rotating extrusion screw wherein the pressure to which the polyethylene is subjected first increases progressively, then decreases abruptly, and finally increases again progressively toward the discharge end of the extrusion apparatus, and forcing an elemental gas selected from the group consisting of nitrogen, argon, neon and helium into the polyethylene stream in the extrusion apparatus at the point where the pressure thereon decreases abruptly, whereby the gas is thoroughly admixed with the polyethylene during the final increase of pressure and expands the polyethylene into cellular form on discharge from the extrusion apparatus.

2. The method of claim 1, wherein the elemental gas is nitrogen.

References Cited in the file of this patent

UNITED STATES PATENTS

| 1,156,096 | Price | Oct. 12, 1915 |
| 2,515,250 | McIntire | July 18, 1950 |
| 2,622,469 | Gray | Dec. 23, 1952 |
| 2,669,751 | McCurdy et al. | Feb. 23, 1954 |
| 2,719,325 | Franklin | Oct. 4, 1955 |
| 2,733,051 | Street | Jan. 31, 1956 |
| 2,766,481 | Henning | Oct. 16, 1956 |
| 2,774,105 | Bernhardt | Dec. 18, 1956 |

FOREIGN PATENTS

| 1,081,583 | France | Dec. 21, 1954 |

OTHER REFERENCES

Higgins: Modern Plastics, March 1954, pp. 99, 100, 102, 104. Published by Breskin Publications, Inc. (Bristol, Conn.). (Copy in Scientific Library.)